United States Patent Office 3,377,176
Patented Apr. 9, 1968

3,377,176
ALUMINA CERAMIC
Vladimir E. Wolkodoff, Wheatridge, and Robert E. Weaver, Arvada, Colo., assignors to Coors Porcelain Company, Golden, Colo., a corporation of Colorado
No Drawing. Filed Dec. 4, 1964, Ser. No. 416,139
13 Claims. (Cl. 106—46)

ABSTRACT OF THE DISCLOSURE

This invention comprehends a cold formed and then sintered essentially glass-free ceramic body having a density of at least 3.97 grams per cubic centimeter and containing upwards of 99.5% by weight aluminum oxide essentially all of which has a crystal size not exceeding 5 microns. Such ceramic body is made by forming a self-sustaining ceramic powder compact having a density of at least 2 grams per cubic centimeter and in which essentially all of the aluminum oxide has a grain size of less than 1 micron and preferably less than .5 micron and firing such self-sustaining compact at a temperature of about 1400 to 1550° C. to sinter the ceramic. In the preferred embodiment the ceramic composition is 99.9% aluminum oxide and the remainder yttrium oxide and magnesium oxide which function to inhibit aluminum oxide crystal growth during firing.

---

The subject matter of the present invention is a new and improved high alumina ceramic and method for manufacturing same.

At the present state of the art, most ceramic electrical insulators, industrial ceramics and the like are manufactured of a composition which contains upwards of about 95% aluminum oxide plus small amounts of various fluxing or glass forming additives which result in a glassy phase formed in situ during the firing operation. Typical of such high alumina ceramics now in use would be one containing about 95% aluminum oxide, 3% silica and 2% alkaline earth metal oxide and fired at about 1750° C. The physical properties of such a ceramic would be typically: density, about 3.75; compressive strength about 300,000 p.s.i., Rockwell hardness (R45N), about 76; modulus of rupture (flexural strength) about 50,000 p.s.i. The structure of such ceramics, as can be found by petrographic analysis, is marked by the alumina crystal size, predominantly 25 microns and larger, by the presence of microvoids with resultant discontinuous porosity and by the presence of the glassy phase which has formed in situ during firing by the interaction of the glass forming ingredients and the alumina. The glassy phase is advantageous in that it accounts in large measure for the relatively high density and low porosity and for the thermal shock resistance and certain other advantageous physical properties. However, the presence of the glassy phase significantly limits certain of the physical properties which can be attained, and for many uses such ceramics are inadequate.

It is, of course, well known that sintered ceramics can be manufactured of one hundred percent aluminum oxide or of a very high percentage of aluminum oxide plus small amounts of non-glass forming oxides; however, in commercial practice such compositions have not attained success even comparable to that of the glass-phase type bodies. The reason here again is that such ceramics while excellent in certain physical properties are deficient in others, so much so that they fail to meet the requirements for important market areas. The undesirable properties apparently result from the large average crystal size, the presence of microvoids and, in some instances, detrimental residual stresses resulting from the large crystal sizes and the high firing temperature used in their manufacture. Also, at the present state of art, these so-called pure oxide or mixed oxide bodies have proved difficult and expensive to manufacture on a large production basis while yet maintaining adequate quality control, the reason being that their quality is much dependent on precise processing conditions. In recent years, for example, much work has been conducted on transparent alumina bodies made from one hundred percent or close to one hundred percent sub-micron size aluminum oxide. The transparency thus attained is indeed far superior to that of other sintered alumina ceramics and such bodies have merit where a high temperature resistant transparent material is required. However, these transparent bodies do not meet the needs for most ceramic applications for the reasons alluded to above.

It is the principal object of the present invention to provide a greatly improved high alumina ceramic, one which has a combination of physical properties, including mechanical strength and toughness, far superior to those of existing ceramics and yet which can be manufactured simply and at low cost. The present invention has as another of its objects the provision of an improved sintered oxide type ceramic containing upwards of 99.5% aluminum oxide plus a small but effective amount of non-glass forming additive oxide to inhibit crystal growth of the aluminum oxide during sintering. Still another object is the provision of an improved method for manufacturing high alumina ceramics having outstandingly excellent mechanical, electrical and chemical properties.

Briefly, these objects are accomplished in accordance with the invention by a sintered essentially glass-free ceramic body containing at least about 99.5% and preferably 99.9% or more by weight aluminum oxide, essentially all of which is in the form of randomly oriented crystals having a crystal size not exceeding 5 microns, and having a density of at least about 3.97 g./cc. Such ceramic bodies have a compressive strength upwards of 500,000 p.s.i., a modulus of rupture upwards of 75,000 p.s.i. and a Rockwell hardness (R45N) in excess of about 90. In addition, they are marked by their excellent dielectric strength, thermal shock resistance and other useful physical, chemical and electrical characteristics. Further, in accordance with the invention, such bodies are manufactured by the steps of (1) first forming a raw ceramic batch containing at least 99.5% (by weight) aluminum oxide and preferably also a small but effective amount of additive oxide to serve as a crystal growth inhibitor, essentially all of the aluminum oxide in the batch having a sub-micron grain size, preferably .5 micron and finer; (2) pressing the raw batch to form a green compact of the shape desired and with a density of at least 2.2 grams per cc.; and (3) firing the green compact to cause sintering, preferably at 1400° to 1550° C. and preferably in a vacuum or in hydrogen though air firing may be used if desired. For optimum results both in the attainment of fine particle size in the raw batch and in the attainment of high density in the green compact, the raw batch should be dry milled in the presence of a grinding aid as will be hereinafter described in detail. Ceramics can be manufactured in accordance with the preferred embodiment of the invention having a density of about 3.99 (this being 100% theoretical density and hence meaning—no voids), a compressive strength of over 600,000 p.s.i., a modulus of rupture of over 100,000 p.s.i., and a Rockwell hardness (R45N) in excess of 91, together with superb thermal shock resistant, dielectric strength and other useful properties. Such preferred bodies are marked by an alumina crystal size on the order of 2 to 3 microns, substantially all the crystals being less than 4 microns. We have found that it is the combination of the extremely small crystal size of the randomly oriented aluminum oxide crystals in the fired body, the absence of a glassy phase and the extremely high density which gives rise to the outstanding superior properties. Surprisingly, we have also found that the sintering of such body to the high density can be accomplished at temperatures on the order of 1400–1550° C. as compared with the much higher firing temperatures, on the order of 1700° C. and higher, normally associated with the attainment of satisfactory properties in a sintered high alumina body. Further, it is not necessary to apply pressure to the bodies during firing in order to accomplish the high density. As a result, ceramic bodies outstandingly superior to those heretofore available can be manufactured at reduced processing costs by reason of the lower firing temperature and simplified firing technique required.

Other objects, advantages and important features will appear more clearly from the following detailed description of preferred embodiments thereof.

Formulation of the raw batch

For optimum physical properties in the finished ceramic product, it is important that the raw batch be formulated to contain about 99.5% or more alumina. We prefer high purity (at least about 99.7%) substantially soda and silica free alpha alumina with no more than about 10% of the lower forms such as kappa, theta, delta or gamma alumina. The lower forms of alumina can be used if desired but since they usually have lower bulk densities, they are more difficult to handle and, what is worse, show high shrinkage during firing as compared with alpha alumina. As has been alluded to above and as will be amplified upon hereinafter, the alumina particle size prior to the body forming operation should be sub-micron and preferably less than .3 micron, and hence the smaller the particle size of the alumina prior to grinding the better. Excellent ceramic bodies can, in accordance with the invention, be manufactured of substantially 100% aluminum oxide; however, by far the preferred practice is to include up to about .5%, and preferably about .1% by weight of an oxide or oxides other than aluminum oxide which will serve to inhibit alumina crystal growth during the firing operation. With such additive oxide, sintered bodies with an alumina crystal size of less than 3 microns can be attained. Any of the following oxides, alone or in combination, will serve as crystal growth inhibitors during firing: $MgO$, $Cr_2O_3$, $NiO$, $TiO_2$, $CeO_2$, $V_2O_5$ and the rare earth oxides, especially yttrium oxide. Magnesia in combination with any of the other oxides listed is excellent. The preferred additive is yttria in combination with magnesia, .05% $Y_2O_3$ plus .05% $MgO$ being outstanding. With this combination alumina bodies can be attained having a density of 3.99, alumina crystal size of about 2 to 3 microns and with commensurately excellent mechanical strength and other properties.

As indicated above, it is preferred that the additive oxide by present in amount of about .1%. Such amount provides maximum crystal growth inhibiting effect and while larger amounts can be used there is no advantage in doing so and there is the slight disadvantage that the aluminum oxide content is lower.

The crystal growth inhibiting additive oxide remains in the ceramic through the firing operation and can be detected by chemical analysis of the finished product. Generally it appears, at least for the most part, in combination with alumina though at times it may also appear to some extent in solid solution. It will be understood, therefore, that when the body is herein specified to contain additive oxide, this does not necessarily mean that such oxide exists as such in the body since it can and generally will exist in the body in combined form with some of the aluminum oxide.

It will also be understood that the additive oxides instead of being added to the batch as such can be added as compounds which convert to the oxide on firing, for example the carbonate, and hence the term magnesium oxide or magnesia, for example, as used herein are intended to comprehend such compounds. Of course, where the carbonate or other such compound is used, the amount added to the batch should be such as to provide the desired amount of the oxide.

The additives should be of a good commercial grade without excessive impurity. Slight impurity is tolerable since in the overall batch the amount of impurity so introduced is negligible. The grain size of the additives should preferably be sub-micron.

Grinding operation

The alumina with or without the additives in the proportions indicated, is placed in a ball mill, and to this ceramic batch there is added a small but effective amount of a material which forms a thin lubricative and static charge reducing film on the ceramic particles to allow them to easily slip with respect to each other and thereby prevent agglomeration of the particles in the mill. Such material serves as a grinding aid by maintaining the batch in a relatively loose noncompacted condition during the grinding operation. Oleic acid, stearic acid and naphthenic acid, in an amount of about .5 to 3% of the weight of the batch, are excellent as grinding aids. Since they are organic they are, of course, vaporized or burned out during the subsequent firing operation.

With the grinding aid included, the batch is ball milled until the particle size of substantially all the aluminum oxide is sub-micron and preferably no larger than .3 micron. The grinding aid is important to the attainment of optimum results because of its beneficial effect in providing the small grain size and good grain size distribution during the grinding operation. Wet milling can be used instead of the dry milling as described above, but wet milling is less efficient for attaining the necessary reduction in particle size.

Pressing operation

After grinding the raw batch is cold formed into green self-sustaining compacts of the shape desired, either by dry pressing which is preferred, by spray drying and isostatic molding as taught in United States Patents 2,251,454 and 2,290,910, or by injection molding as disclosed, for example, in U.S. Patents 2,122,960 and 2,446,872. For simple shapes such as cylinders or the like, dry pressing in matched metal dies is excellent. Due to the extremely small grain size and grain size distribution of the batch and also by reason of the presence of the grinding aid which functions in the nature of a lubricant allowing one grain to slide with respect to the other, an extremely high compaction density can be accomplished with relatively low pressure, on the order of 2,000 to 5,000 pounds per square inch.

After such pressing, the density of the resulting green compact should be at least 2 grams per cc. and preferably upwards of 2.2 g./cc. A density of 2.4 can be attained with 4,000 p.s.i. without difficulty and we have attained densities on the order of 2.7. With a high green compact density there is less shrinkage during the subsequent firing operation and this is important since with less shrinkage there is less difficulty in maintaining tolerances. For efficient commercial manufacturing operations it is imperative that reasonably good tolerances be maintained; the extreme hardness and toughness of the final fired product renders it difficult and expensive to effectively machine to tolerances.

For the grinding operation it is satisfactory to use a rubber lined mill and substantially 100% alumina mill balls; however, the preferable technique is to use ceramic lining and mill balls the same as the ceramic being manufactured to thereby reduce contamination to a minimum. It can be appropriately mentioned at this point that the ceramics of this invention are outstandingly excellent for use as mill balls and mill liners; there is extremely little wear because of the hardness, toughness and mechanical strength of the material.

It may be desirable for the manufacture of various types of ceramic articles, particularly those of complex contour, to shape the raw batch into the desired self-sustaining compacts by the well known injection molding technique wherein an organic resin is used as a binder, or by the equally well known method of spray drying to incorporate wax as a binder and then molding in rubber molds. If the latter processing technique is used, it is recommended that for the grinding operation a grinding aid other than naphthenic acid or other hydrophobic compound be selected since the hydrophobic compounds tend to interfere with the preparation of the water-wax ceramic batch emulsion which is required with this processing technique.

It will be understood that the term "cold formed" as used herein means that the ceramic powder is compacted and shaped, as by pressing or molding, prior to the sintering operation, this as distinguished from hot formed or hot pressed bodies which are shaped and pressed by the application of pressure during sintering.

Firing operation

Preferably the ceramic should be fired in a hydrogen atmosphere or in a vacuum though firing in ordinary atmosphere, air, gives excellent results as will hereinafter be described in detail. Prior to firing to sintering temperature in hydrogen or a vacuum, it is necessary to first fire the green compacts in ordinary atmosphere, i.e., an oxidizing atmosphere, at a temperature sufficient to burn out the organic material. Firing at about 800 to 1100° C. for about one hour in ordinary atmosphere is sufficient. The compacts are then fired to sintering temperature in hydrogen or a vacuum. Sintering to maximum density can be accomplished by firing at from about 1400 to 1550° C., generally for about four hours.

By such firing in a vacuum or in a hydrogen atmosphere and with the ceramic batch of the composition and particle size described, finished ceramic articles with exceptionally good physical properties can be attained. Outstanding among these physical properties are: high density, on the order of 3.99; mechanical strength, for example compressive strength upwards of 600,000 p.s.i.; hardness on the Rockwell R45N scale of about 92; modulus of rupture over 100,000 p.s.i.; along with superb thermal shock resistance, dielectric strength, chemical resistance, etc. These excellent physical properties are explained at least in part by the excellent crystal structure of the fired articles; petrographic analysis and electron microscopy shows that the alumina crystal size (i.e. the size of the largest crystal dimension) is on the order of about 2 to 4 microns, with substantially none of the crystals exceeding 5 microns. Hence, the crystals are of relatively uniform size. They are in random arrangement and have excellent conformal contacts. In conventional high alumina ceramics an alumina crystal size of 25 microns is considered excellent, and crystal sizes of about 40 microns are more conventional.

For many types of ceramic articles which do not require the very optimum in physical properties, it may be advantageous from the cost standpoint to use an ordinary oxidizing atmosphere sintering operation. Firing of the green compacts, generally for about four hours, at about 1450° C. to 1550° C. in air produces excellent results. The ceramic bodies so manufactured have an alumina crystal size of about 3 to 5 microns which is slightly larger than the crystal size attained by hydrogen or vacuum firing, but the crystal structure and orientation is otherwise similar. The air fired bodies have a density on the order of 3.97 to 3.98, modulus of rupture of between 85,000 and 100,000 p.s.i. and a Rockwell hardness and compressive strength similar to those of the hydrogen or vacuum fired bodies.

The bodies need not have pressure applied during the firing operation to attain the high density and other characteristics described. Inclusion of crystal growth inhibiting oxides in the batch is more important to the attainment of optimum results where air firing is used then where the bodies are fired in hydrogen or a vacuum. For the very best results both the additive oxide to inhibit crystal growth and the hydrogen or vacuum firing are desirable.

Bodies with an as-fired surface of 3–5 RMS (root mean squares) are easily attained by the practice of the invention. Using only a slight polish of the as-fired surface with, say, ¼ micron diamond paste, surface finishes of 1 RMS or less can be accomplished. Hence, the ceramics of this invention are excellent for use as unglazed substrates for metallized printed circuits and the like.

EXAMPLE 1

A raw batch was formed by mixing aluminum oxide (predominantly all alpha alumina), magnesium oxide and chromium oxide in proportions to provide 99.9% (by weight) alumina, .05 chromia and .05% magnesia. To this ceramic batch was added oleic acid in an amount equal to about 2% of the weight of the batch. Such batch was then dry milled in a ball mill, the mill lining and the balls used being of the same ceramic as that being manufactured. Such milling was continued until the particle size was .3 micron and finer, and the batch was then dry pressed to cylindrical shaped green compacts in matched metal dies by the application of 4000 p.s.i. The density of the green compacts was about 2.40. Such green compacts were then fired in an oxidizing atmosphere for one hour at 1100° C., and immediately thereafter fired at 1475° C. for four hours in a hydrogen atmosphere. The resulting fired ceramic articles had a density of 3.98 and an alumina crystal size of about 2 to 5 microns.

EXAMPLE 2

Same as Example 1 except that the green compacts were fired in a single firing operation in air for four hours at 1475° C. The resulting fired articles had a density of 3.98. The alumina crystal size was about 2 to 5 microns.

EXAMPLE 3

Same as Example 1 except that .05 $TiO_2$ was used in place of the $Cr_2O_3$. The resulting fired articles had a density of 3.98 and an alumina crystal size of about 3 to 5 microns.

EXAMPLE 4

Same as Example 1 except that the ceramic batch consisted of 100% alumina, the magnesia and chromia being left out. The resulting ceramic articles had a density of 3.97 and an alumina crystal size of 5 microns and less.

EXAMPLE 5

Same as Example 1 except that .05% yttria was used in place of the chromia. The resulting fired articles had a density of 3.99 and an alumina crystal size of 3 microns and less.

EXAMPLE 6

Same as Example 5 except that the green compacts were fired in a single firing operation in air for four hours at 1475° C. The resulting fired articles had a density of 3.98. The alumina crystal size was 2 to 4 microns.

Ceramic articles made in accordance with the invention are useful for all products where high alumina type ceramics are now used, for example, spark plug and other electrical insulators, mill balls and liners, pump plungers, valves, nozzles, bearings, gages and other industrial ceramics. As alluded to above the ceramic has a very smooth surface finish and hence requires no glaze except, of course, where glaze is desired for decorative purposes. Because of their outstanding physical properties as compared with previous ceramics, the products of this invention open up new areas of applications where ceramics have not heretofore been widely used. By reason of their high mechanical strength, hardness, and toughness, the ceramics are excellent for tool bits and the like, applications where such materials as tungsten carbide have heretofore been used. Excellent stamping and cutting dies can be made of the ceramic because of its outstanding impact resistance. Tool bits formed of the ceramic are considerably less expensive than and compare well in cutting power and durability with tungsten carbide tool bits.

It will be understood that while the invention has been described specifically with reference to preferred embodiments thereof, various changes and modifications may be made all within the full and intended scope of the claims which follow.

We claim:

1. A cold formed and then sintered essentially glass-free ceramic body containing at least about 99.5% by weight aluminum oxide and having a density of at least about 3.97 grams per cubic centimeter, essentially all of the aluminum oxide being present in said body in the form of randomly oriented crystals having a size not exceeding about 5 microns.

2. A body as set forth in claim 1 containing yttrium oxide and magnesium oxide.

3. A body as set forth in claim 1 containing at least about 99.9% by weight aluminum oxide at least a major portion of which has a crystal size of less than 4 microns.

4. A body as set forth in claim 3 containing about .05% by weight yttrium oxide and about .05% by weight magnesium oxide.

5. A method for making a ceramic body comprising the steps of forming a self-sustaining ceramic powder compact having a density of at least about 2 grams per cubic centimeter, at least about 99.5% by weight of the ceramic powder in said compact being aluminum oxide essentially all of which is of sub-micron grain size, and then firing said self-sustaining compact at a temperature of about 1400° C. to 1550° C. to sinter the ceramic to a dense body in which essentially all of the aluminum oxide is present in the form of randomly oriented crystals having a size not exceeding about 5 microns.

6. A method as set forth in claim 5 wherein said compact is fired in an oxidizing atmosphere.

7. A method as set forth in claim 5 wherein said compact is fired in a hydrogen atmosphere.

8. A method as set forth in claim 5 wherein said compact is fired in a vacuum.

9. A method as set forth in claim 5 wherein at least a major portion of the ceramic powder in said compact is alpha aluminum oxide.

10. A method as set forth in claim 5 wherein essentially all of the aluminum oxide in said compact has a grain size not exceeding .5 micron.

11. A method as set forth in claim 10 wherein said compact contains at least about 99.9% by weight aluminum oxide.

12. A method for making a ceramic body comprising the steps of forming a self-sustaining ceramic powder compact having a density of at least about 2 grams per cubic centimeter, at least about 99.9% by weight of the ceramic powder in said compact being aluminum oxide essentially all of which has a grain size of about .3 micron and finer and at least about 90% of which is alpha aluminum oxide, and then firing said self-sustaining compact at a temperature of about 1400° C. to 1550° C. to sinter the ceramic to a body having a density of at least about 3.97 grams per cubic centimeter and in which essentially all of the aluminum oxide is present in the form of randomly oriented crystals having a size not exceeding about 5 microns.

13. A method as set forth in claim 12 wherein said compact contains yttrium oxide and magnesium oxide.

References Cited

UNITED STATES PATENTS

| | | | |
|---|---|---|---|
| 3,088,832 | 5/1963 | Somers | 106—65 |
| 3,093,498 | 6/1963 | Whittemore et al. | 106—65 |
| 3,252,810 | 5/1966 | Somers | 106—65 |

TOBIAS E. LEVOW, *Primary Examiner.*

JAMES E. POER, *Examiner.*